(12) United States Patent
Harpaz et al.

(10) Patent No.: US 9,342,419 B2
(45) Date of Patent: May 17, 2016

(54) PERSISTENT MESSAGING MECHANISM

(71) Applicant: GLOBALFOUNDRIES Inc., Grand Cayman (KY)

(72) Inventors: Avraham Harpaz, Haifa (IL); Nir Naaman, Haifa (IL); Idan Zach, Nesher (IL)

(73) Assignee: GlobalFoundries Inc., Ugland House (KY)

( * ) Notice: Subject to any disclaimer, the term of this patent is extended or adjusted under 35 U.S.C. 154(b) by 235 days.

(21) Appl. No.: 14/076,278

(22) Filed: Nov. 11, 2013

(65) Prior Publication Data

US 2015/0135001 A1    May 14, 2015

(51) Int. Cl.
G06F 11/00   (2006.01)
G06F 11/20   (2006.01)
G06F 11/14   (2006.01)

(52) U.S. Cl.
CPC ............ *G06F 11/2089* (2013.01); *G06F 11/14* (2013.01); *G06F 11/1471* (2013.01)

(58) Field of Classification Search
CPC .............................. G06F 11/1471; G06F 11/14
See application file for complete search history.

(56) References Cited

U.S. PATENT DOCUMENTS

| | | | | |
|---|---|---|---|---|
| 4,507,751 | A * | 3/1985 | Gawlick .................... | G06F 9/44 |
| 5,452,430 | A | 9/1995 | Dievendorff et al. | |
| 5,864,849 | A * | 1/1999 | Bohannon ........... | G06F 11/1471 707/648 |
| 6,016,553 | A * | 1/2000 | Schneider ........... | G06F 11/1435 714/21 |
| 6,067,550 | A * | 5/2000 | Lomet .................. | G06F 11/1471 |
| 6,182,086 | B1 * | 1/2001 | Lomet .................. | G06F 11/1471 |
| 6,289,355 | B1 * | 9/2001 | Haderle ............... | G06F 11/1471 |
| 7,127,507 | B1 | 10/2006 | Clark et al. | |
| 7,203,796 | B1 | 4/2007 | Muppalaneni et al. | |
| 7,716,422 | B2 | 5/2010 | Shin et al. | |

(Continued)

FOREIGN PATENT DOCUMENTS

WO    2013095381    6/2013

OTHER PUBLICATIONS

Volos et al., "Mnemosyne: Lightweight Persistent Memory", ASPLOS '11: Proceedings of the 16th International Conference on Architectural Support for Programming Languages and Operating Systems, Mar. 2011.

(Continued)

*Primary Examiner* — Yolanda L Wilson
(74) *Attorney, Agent, or Firm* — Heslin Rothenberg Farley & Mesiti P.C.; George Blasiak

(57) ABSTRACT

A method comprising using at least one hardware processor for managing persistent messaging data in a volatile memory, writing the persistent messaging data to a first section of a Fast Persistent Memory (FPM), responsive to the first section of the FPM approaching a full state, offloading the persistent messaging data from the first section of the FPM to a hard disk device (HDD), and erasing the persistent messaging data from the first section of the FPM, recording, in a second section of the FPM, an identifier of said offloading, responsive to receiving a request to erase or modify at least some of the persistent messaging data in the HDD, updating the identifier of the offloading in the second section of the FPM while leaving the persistent messaging data in the HDD intact, and responsive to a server failure, selectively reading at least some of the persistent messaging data from the HDD to the volatile memory, wherein the selective reading is based on the identifier of the offloading in the second section of the FPM.

20 Claims, 10 Drawing Sheets

(56) References Cited

U.S. PATENT DOCUMENTS

| | | |
|---|---|---|
| 8,370,847 B2 | 2/2013 | Bedi et al. |
| 2002/0078132 A1 | 6/2002 | Cullen et al. |
| 2002/0156983 A1 | 10/2002 | Jones et al. |
| 2004/0024794 A1* | 2/2004 | Jain .................... G06F 9/546 |
| 2006/0156064 A1* | 7/2006 | Damani ............. G06F 11/1471 |
| | | 714/16 |
| 2007/0150654 A1 | 6/2007 | Shin et al. |
| 2010/0005798 A1 | 1/2010 | Finkbeiner et al. |
| 2010/0023681 A1 | 1/2010 | Sinclair et al. |
| 2012/0110253 A1 | 5/2012 | Georgi et al. |
| 2013/0067289 A1 | 3/2013 | Maisols et al. |
| 2013/0086330 A1 | 4/2013 | Baddepudi et al. |
| 2014/0359375 A1* | 12/2014 | Longobardi ........ G06F 11/1471 |
| | | 714/45 |

OTHER PUBLICATIONS

Burr et al., "Overview of candidate device technologies for storage-class memory", IBM Journal of Research and Development, vol. 52, Issue 4.5, Jul. 2008.

* cited by examiner

PERSISTENT MESSAGING MECHANISM

BACKGROUND

Present embodiments relate to the field of persistent messaging.

In publish/subscribe and message queuing systems, multiple clients are connected to a server (sometimes referred to as broker or a queue manager) and use it to exchange messages between them. Many providers of publish/subscribe and queuing messaging services implement a message persistence mechanism that ensures messages can survive server restart. Message persistence is required in order to provide services such as durable subscription, assured message delivery and transactional messaging. In many cases, messages are persisted to a hard disk device (HDD) or to a database. Since an incoming message must commonly be persisted before it can be fully processed and delivered, the persistence stage is often the performance bottleneck in the server and thus the whole publish/subscribe system.

A single node server provides fault tolerance due to its ability to restore its former state, from non-volatile memory, after a failure at any given time without data loss. In many cases, however, it is also required that the server be highly available. In order to provide High Availability (HA), two or more nodes, each running an instance of the server, may be used.

The foregoing examples of the related art and limitations related therewith are intended to be illustrative and not exclusive. Other limitations of the related art will become apparent to those of skill in the art upon a reading of the specification and a study of the figures.

SUMMARY

The following embodiments and aspects thereof are described and illustrated in conjunction with systems, tools and methods which are meant to be exemplary and illustrative, not limiting in scope.

There is provided, in accordance with an embodiment, a method comprising using at least one hardware processor for managing persistent messaging data in a volatile memory; writing said persistent messaging data to a first section of a Fast Persistent Memory (FPM); responsive to the first section of the FPM approaching a full state, offloading the persistent messaging data from the first section of the FPM to a hard disk device (HDD), and erasing the persistent messaging data from the first section of the FPM; recording, in a second section of the FPM, an identifier of said offloading; responsive to receiving a request to erase or modify at least some of the persistent messaging data in the HDD, updating the identifier of said offloading in the second section of the FPM while leaving the persistent messaging data in the HDD intact; and responsive to a server failure, selectively reading at least some of the persistent messaging data from the HDD to the volatile memory, wherein said selective reading is based on the identifier of said offloading in the second section of the FPM.

There is further provided, in accordance with an embodiment, a computer program product for persistent message handling, the computer program product comprising a non-transitory computer-readable storage medium having program code embodied therewith, the program code executable by at least one hardware processor to: manage persistent messaging data in a volatile memory; write said persistent messaging data to a first section of a Fast Persistent Memory (FPM); responsive to the first section of the FPM approaching a full state, offload the persistent messaging data from the first section of the FPM to a hard disk device (HDD), and erase the persistent messaging data from the first section of the FPM; record, in a second section of the FPM, an identifier of said offloading; responsive to receiving a request to erase or modify at least some of the persistent messaging data in the HDD, update the identifier of said offloading in the second section of the FPM while leaving the persistent messaging data in the HDD intact; and responsive to a server failure, selectively read at least some of the persistent messaging data from the HDD to the volatile memory, wherein said selective read is based on the identifier of said offload in the second section of the FPM.

There is yet further provided, in accordance with an embodiment, a server comprising: a volatile memory; a Fast Persistent Memory (FPM); a hard disk device (HDD); and a hardware processor operatively coupled to said volatile memory, said FPM and said HDD, wherein said hardware processor is configured for: managing persistent messaging data in said volatile memory; writing said persistent messaging data to a first section of said FPM; responsive to the first section of said FPM approaching a full state, offloading the persistent messaging data from the first section of said FPM to said HDD, and erasing the persistent messaging data from the first section of said FPM; recording, in a second section of said FPM, an identifier of said offloading; responsive to receiving a request to erase or modify at least some of the persistent messaging data in said HDD, updating the identifier of said offloading in the second section of said FPM while leaving the persistent messaging data in said HDD intact; and responsive to a server failure, selectively reading at least some of the persistent messaging data from said HDD to the volatile memory, wherein said selective reading is based on the identifier of said offloading in the second section of said FPM.

In some embodiments, the first section of the FPM is divided into two or more sub-sections, and wherein said offloading is from one of the two or more sub-sections.

In some embodiments, the method further comprises using the at least one hardware processor for compacting at least some of the persistent messaging data in the HDD, wherein said compacting is based on the identifier of said offloading in the second section of the FPM.

In some embodiments, the compacting comprises: reading at least some of the contents of the HDD to the volatile memory; determining which portion of the at least some of the contents is to be erased, wherein said determining is based on the identifier of said offloading in the second section of the FPM; and writing, to the HDD, the at least some of the contents less the portion determined to be erased.

In some embodiments, the compacting further comprises: writing said at least some of the contents less the portion determined to be erased to a buffer; and resizing said written buffer to fit the size of its content, wherein said writing, to the HDD, the at least some of the contents less the portion determined to be erased comprises writing said written buffer to said HDD.

In some embodiments, the compacting further comprises: marking said at least some of the contents less the portion determined to be erased as in use; initializing said portion determined to be erased; and compressing said at least some of the contents of the HDD.

In some embodiments, reading of at least some of the persistent messaging data from the HDD to the volatile memory is performed only in response to said server failure.

In some embodiments, the selectively reading at least some of the persistent messaging data from the HDD to the volatile memory in response to said server failure is performed wherein at least some of the persistent messaging data is in a compacted form and without expanding it.

In some embodiments, the persistent messaging data comprises one or more objects, and wherein said method further comprises providing a translation map to allow a direct access to an object of said at least some of the persistent messaging data in a compacted form in said HDD.

In some embodiments, the compacting comprises modifying said at least some of the persistent messaging data in the HDD based on said identifier.

In some embodiments, the persistent messaging data comprises one or more objects, wherein each of the offloading forms a data section in the HDD, each data section comprising one or more blocks, and wherein each object offloaded to said HDD is stored in one or more of said blocks.

In some embodiments, the identifier comprises a bitmap for each data section of the HDD, said bitmap comprising a bit for each of said one or more blocks of said data section, the method further comprising: setting to one each bit of said bitmap representing a block being the first block of an active object of said one or more objects offloaded to the data section; and turning off each bit of said bitmap representing a block not being the first block of an active object of said one or more objects offloaded to the data section, wherein said updating of the identifier in response to receiving a request to erase at least some of the persistent messaging data in the HDD comprises turning off the bit representing the first block of each object of the at least some of the persistent messaging data.

In some embodiments, the method further comprises: responsive to receiving a request to erase or modify at least some of the persistent messaging data in the first section of the FPM, erasing or modifying said at least some of the persistent messaging data directly in said FPM.

In some embodiments, the program code is further executable by the at least one hardware processor to compact at least some of the contents of the HDD, wherein said compact is based on the identifier of said offloading in the second section of the FPM.

In some embodiments, the compact comprises: reading at least some of the contents of the HDD to the volatile memory; determining which portion of the at least some of the contents is to be erased, wherein said determining is based on the identifier of said offload in the second section of the FPM; and writing, to the HDD, the at least some of the contents less the portion determined to be erased.

In some embodiments, the server further comprises a compacting unit configured for compacting at least some of the contents of said HDD, wherein said compacting is based on the identifier of said offloading in the second section of said FPM.

In addition to the exemplary aspects and embodiments described above, further aspects and embodiments will become apparent by reference to the figures and by study of the following detailed description.

BRIEF DESCRIPTION OF THE FIGURES

Exemplary embodiments are illustrated in referenced figures. Dimensions of components and features shown in the figures are generally chosen for convenience and clarity of presentation and are not necessarily shown to scale. The figures are listed below.

DETAILED DESCRIPTION

Figure 1:
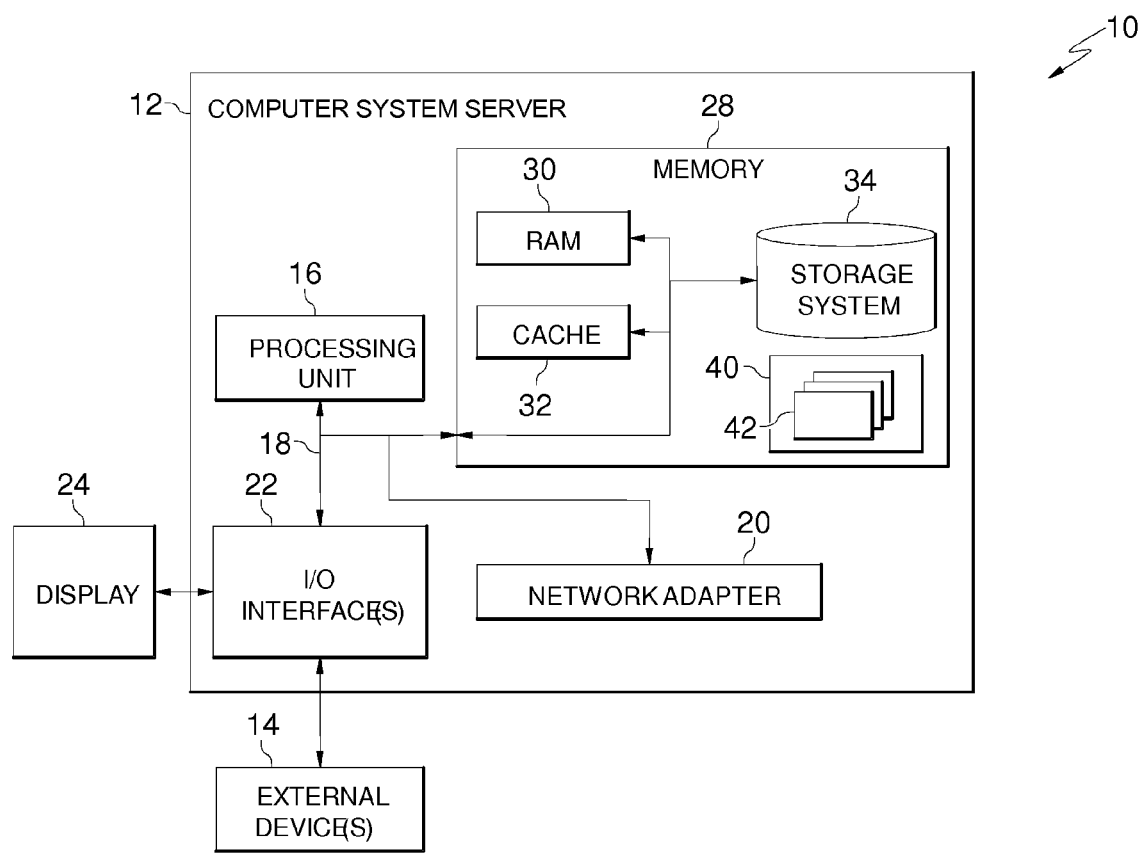
FIG. 1 shows a schematic illustration of an example of a cloud computing node.

A method for handling persistent messaging data in a single node server or in a multiple node server is disclosed herein. The method utilizes a volatile memory for managing a messaging data while the server is up and running. Those of the messages defined as "persistent" messages are stored, in accordance with an advantageous persistence mechanism, in a fast persistent memory (FPM), such as a non-volatile random access memory (NVRAM), and in a hard-disk device (HDD). Upon server restart, when the volatile memory is wiped, the persistent messages are read from the NVRAM and/or from the HDD, thereby ensuring their delivery. Furthermore, multiple instances of the server may provide high availability and utilizing available resources of one or more standby instances of the server may allow for a faster recovery.

The term "persistent data objects" or just "objects" as referred to herein, may relate to objects representing persistent data such as message content, message attributes/properties, subscription information, etc.

The term "hard-disk device" (HDD) may relate to any type of internal or external high capacity storage device, such as a single magnetic hard disk, disk arrays, Solid State Drives (SDD), tape drives, Redundant Array of Independent Disks (RAID) Network Attached Storage (NAS) or Storage Area Network (SAN).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a hardware processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic illustration of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system.

Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
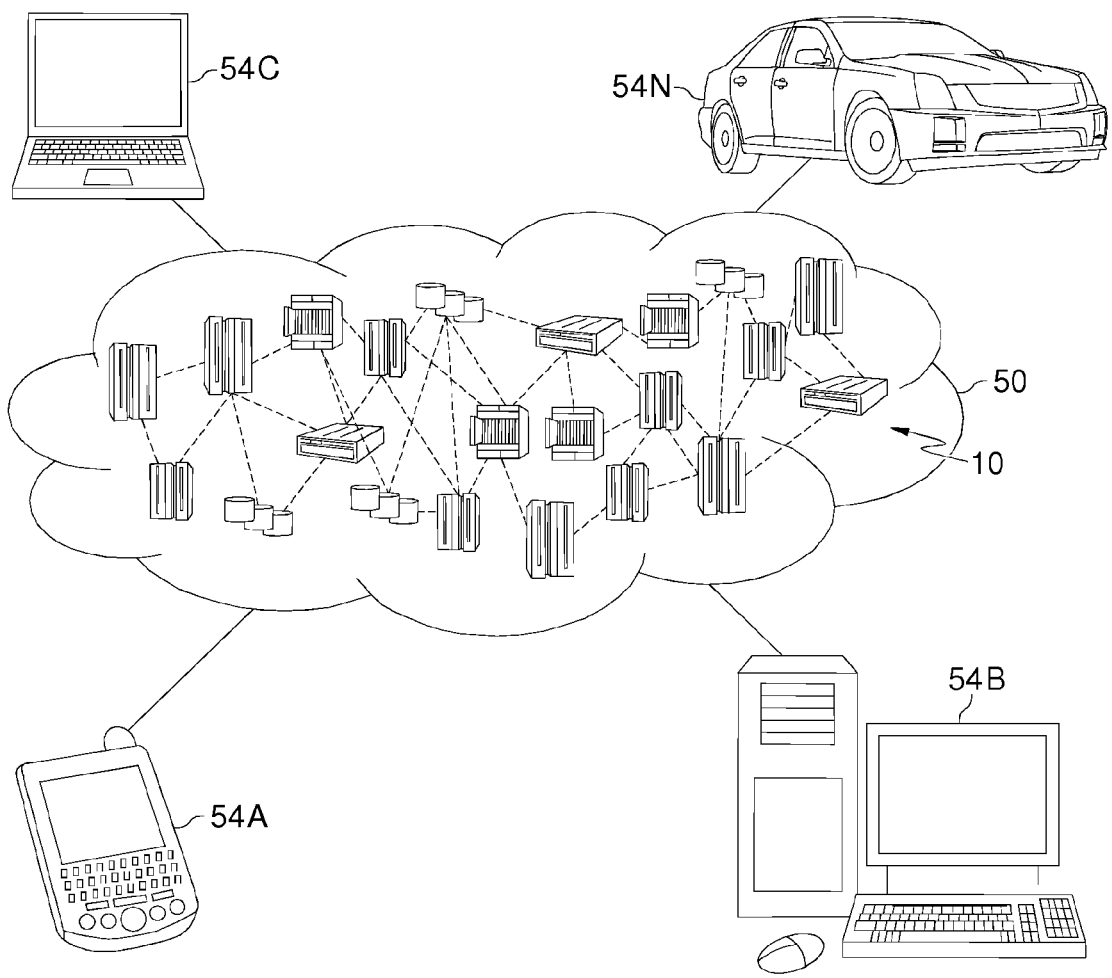
FIG. 2 shows an illustrative cloud computing environment.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
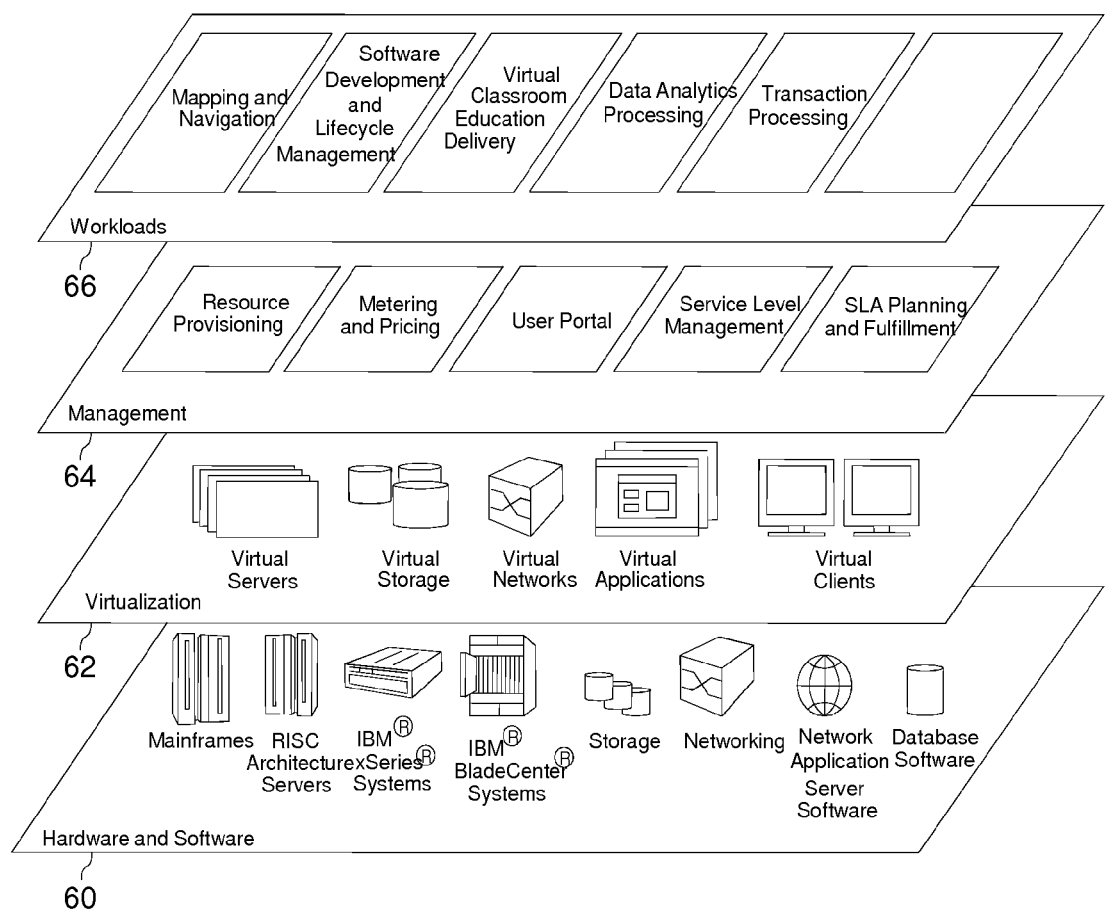
FIG. 3 shows a set of functional abstraction layers provided by the cloud computing environment.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provides pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing.

Figure 4:
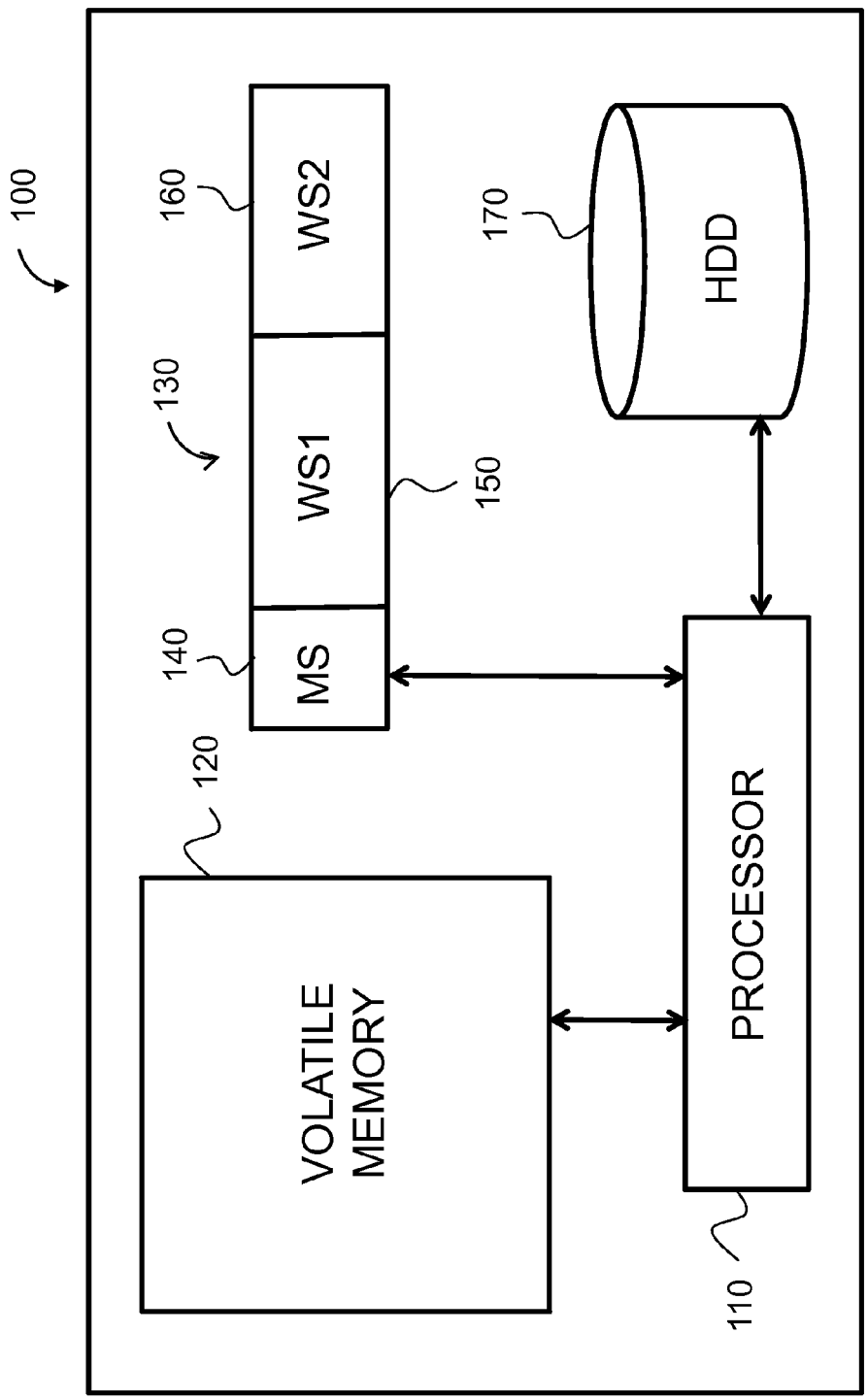
FIG. 4 shows a schematic illustration of a single node server according to an embodiment of the disclosed technique.

Reference is now made to FIG. 4, which shows a schematic illustration of a single node server 100 according to an embodiment of the disclosed technique. Server 100 may include a hardware processor 110, a volatile memory 120, a non-volatile random access memory (NVRAM) 130 and a hard disk device (HDD) 170. NVRAM 130 may include a management section (MS) 140, a first work section (WS1) 150 and a second work section (WS2) 160. Processor 110 is operatively coupled with volatile memory 120, NVRAM 130 and HDD 170. Server 100 may be used for managing messaging data which includes persistent messaging data. Processor 110 and volatile memory 120 may be used to maintain and manage the entire message information. NVRAM 130 may be used to store recent persistent messaging data. HDD 170 may be used to store older persistent messaging data that can no longer be stored in NVRAM 130 due to the limited amount of NVRAM 130 available. Generally speaking, HDD 170 may have the slowest speed but highest capacity with respect to volatile memory 120 and NVRAM 130.

Server 100 may receive message data from clients and may send data to clients in a publish/subscribe system. Communication between server 100 and the clients may be typically done over a network. When server 100 receives new data from a client it processes the information and updates its state by processor 110 in volatile memory 120. If processing the client's data results in data that should be persisted then the persistent data is written by processor 110 to NVRAM 130.

During run time, objects representing persistent data may be written to persistent memory (i.e., non-volatile memory) or erased from it by server 100. For example, an object representing a new persistent message is written when the message is received; the object is erased after the message has been delivered to all its destinations. The persistent memory used by server 100 is implemented as a combination of data stored in NVRAM 130 and HDD 170. Server 100 is not required to read persisted objects from NVRAM 130 and HDD 170 during run time. The persisted objects may only be read from NVRAM 130 and/or HDD 170 by server 100 during server recovery, after a failure. In addition to write and erase, modification of persistent objects may also be supported.

A memory allocation method in which the WS of an NVRAM or a Disc Section (DS) of an HDD is divided into fixed size blocks may be applied with respect to the disclosed technique. An object that is written to the WS is written into one or more blocks depending on its size. If more than one block is needed the blocks are linked to one another. Such memory allocation method may save the need to allocate contiguous memory for the object, but other memory allocation methods known in the art may be applicable as well. An address or handle may be assigned to the object, which is the address in the WS of the first block used by the object. One should note that according to this memory allocation method, a block may hold one object at most. For example, the size of a WS may be one Gigabyte and each block may be one Kbyte, which means one million blocks per WS. The address of the object may be a 64 bit integer where the first 32 bits represent the WS or DS number or ID (i.e., each DS is assigned a unique ID) and the other 32 bits may represent the block number within the WS or DS. Of course, with 1M blocks it is possible to use fewer bits and reduce the address size.

An NVRAM according to the disclosed technique may be divided into two sections: a Management Section (MS) and a Work Section (WS). The WS may be divided into two or more subsections, i.e., forming two or more WSs. Specifically, as shown in FIG. 4, NVRAM 130 is divided into three sections: MS 140, WS1 150 and WS2 160. MS 140 may be used to store management information that must survive server restart. WS1 and WS2 may be used to store the actual messaging data that must be persisted. At any given time new data may be written only to one of the WSs, the one which is currently acting as the active section. When the active WS, e.g., WS1 150, fills up, the active section is switched to the other WS, i.e., WS2 160, provided that this section is free. WS1 150 which is filled up is then written to HDD 170, for example, to create a DS (not shown). Once WS1 150 has been fully written to HDD 170, WS1 150 becomes free and is then initialized to be ready to become the active section when needed. If the active WS fills up but the other WS is not free yet (data is still being written to HDD 170) then any attempt to add new data (e.g., create and possibly modify an object) may be blocked until one of the WSs becomes free and starts acting as the active WS.

As mentioned herein above, NVRAM 130 may be divided into one or more WSs. When multiple WSs are used, various methods for memory management may be applied, as known in the art. In some embodiments, more than one HDD may be used and when the NVRAM is divided into multiple WSs, a different HDD may be used per one or more WSs.

Server 100 may have various architectures and other than the one shown in FIG. 4, as known in the art. Other forms of fast persistent memory than NVRAM 130 may be used, such as Phase Change Memory (PCM/PRAM) and Ferroelectric RAM (FeRAM). Volatile memory 120 may be RAM (random access memory), such as DRAM or SRAM.

Figure 5:
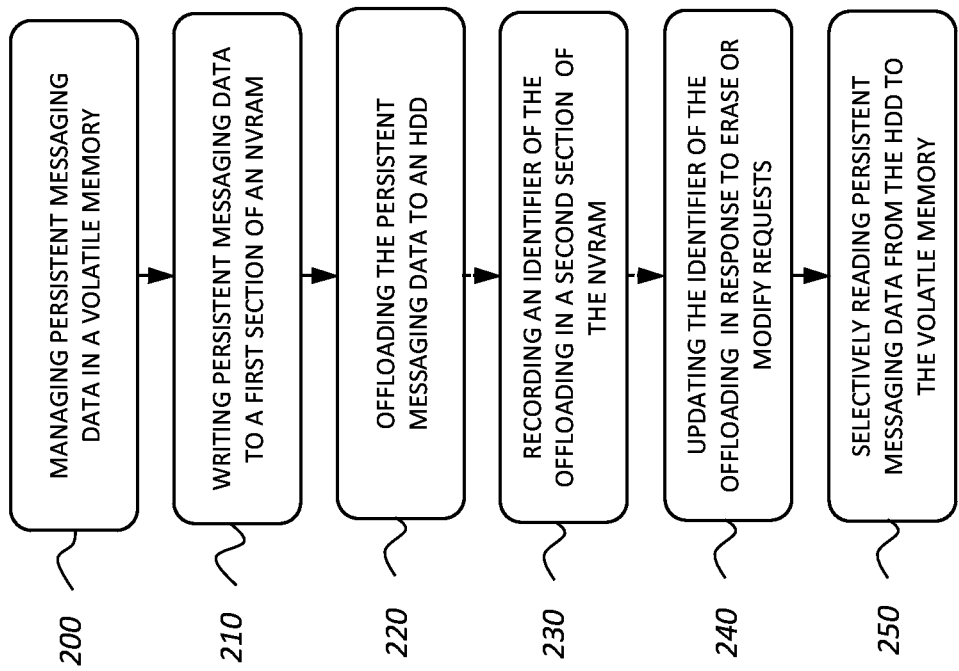
FIG. 5 shows a flowchart of a method for persistent messaging utilizing the single node server of FIG. 4.

Reference is now made to FIG. 5, which shows a flowchart of a method for persistent messaging utilizing single node server 100 of FIG. 4. In a step 200, persistent messaging data is managed in a volatile memory. With reference to FIG. 4, exemplary server 100 manages persistent messaging data in volatile memory 120 by processor 110.

In a step 210, the persistent messaging data is written to a first section of an NVRAM. With reference to FIG. 4, WS1 130 of NVRAM 130 may act as the active WS. The persistent messaging data is written, therefore, to WS1 130 in order to allow persistence of the message data in case of server failure.

Erase and update operations on objects that are in NVRAM may be performed directly in NVRAM. While a WS according to the disclosed technique is acting as the active WS, objects may be modified and erased from it. When an object is erased all the blocks it occupied are freed and can be reused to store new objects. Likewise, modify operations that are performed on objects in the active WS may be performed in the active WS itself. Blocks may be added or erased from an object as a result of a modify operation but the address of the object may not change. Such ability to erase or modify objects in memory means that as long as the amount of persistent data is not larger than the capacity of the WSs in the NVRAM, all operations can be performed in a single WS in an NVRAM without the need to write a WS to an HDD.

In a step 220, in response to the first section of the NVRAM approaching a full state, the persistent messaging data is offloaded from the first section of the NVRAM to an HDD, and the persistent messaging data is erased from the first section of the NVRAM. With reference to FIG. 4, WS1 130 may act as the active WS. WS1 130 may approach a full state. The persistent messaging data is then offloaded from WS1 130 to HDD 170, and the persistent messaging data is erased from WS1 130.

When a new object is written and the active WS does not have enough free blocks to store it, the WS may be closed and another WS in the NVRAM may become the active WS. The full WS may be written to the HDD as a background task allowing new write or erase or modify operations to be performed on the active WS. When the WS is written to the HDD, an identical DS may be created (i.e., the only difference is that the WS is stored in the NVRAM and the DS on the HDD). After the WS is fully written to the HDD and a new DS is holding its content, the WS may become free, and is initialized as a new empty WS with a unique ID. When the other WS will fill up this WS will become the active WS, and so on and so forth.

In a step 230, in a second section of the NVRAM, an identifier for the offloaded DS is recorded. The identifier may be used to identify persistent objects and may maintain information relating to the objects' current location (i.e., memory address) and performed operations, such as erase and modify operations performed on these objects. An identifier may relate to the content of an entire DS or may include multiple identifiers, each relating to one or more objects stored in the DS. An identifier according to the disclosed technique may be implemented in various manners and per specific use. With reference to FIG. 4, an identifier of the offloading of the persistent messaging data is recorded in MS 140 of NVRAM 130. The identifier may include the addressed or handles which were assigned to the objects within the offloaded DS, e.g., the address of the first block used by each object within the DS.

In a step 240, in response to receiving a request to erase or modify at least some of the persistent messaging data in the DS, the identifier of the offloading in the second section of the NVRAM is updated while the persistent messaging data in the DS is left intact. With reference to FIG. 4, in response to receiving a request to erase or modify at least some of the persistent messaging data in the DS, the identifier of the offloading in MS 140 is updated while the persistent messaging data in the DS is left intact.

Erase and modify operations on objects that are stored on the HDD may be encoded in an efficient way, in terms of speed and space, and stored in the MS section of the NVRAM as part of the object's identifiers. The erase and modify operations may not perform any modifications to the data on the HDD. This ensures that these operations can complete fast since the modifications are performed in the NVRAM without any HDD operations. However, if the MS is about to fill up some of its content is written to disk and then cleared to free up space.

There are various ways in which the information about erased objects can be maintained by an identifier stored in the MS. Different methods provide tradeoffs between factors such as the amount of memory consumed, the speed of performing an erase operation, and the information maintained. Two exemplary methods are described below.

In a first method referred to as the bitmap method), the identifier, stored in the MS, may include a bitmap for each DS, where each bit represents a block of the DS. When the DS is created (i.e., when the WS is written to the HDD) the bitmap is created and a bit in the bitmap is set to 1 if the block it represents is the first block of an active or live object. The erase operation simply turns off the bit representing the block in which the erased object is stored in the DS, or turns off the bit representing the first block storing the object (i.e., in case the object is stored in more than one block). To properly handle objects that span multiple blocks the bits for blocks that are not the first block of an object are always turned off in the bitmap. When there are no more set bits in the bitmaps it means that all the objects stored in the DS have been erased and the entire DS can be erased along with its bitmap. This method may allow erase operations that are extremely fast (just set one bit in NVRAM to zero) even when the erased object is stored on the HDD. However, when using this method, there is no information on how many blocks are linked to each block represented in the bitmap.

In a second method referred to as the active block list method), the identifier may include the addresses or offsets of the active blocks (only those that are the first block of an object) along with the information on how blocks are linked to the first block. The identifier may be maintained in a data structure that allows quick updates (e.g., a sorted array). When an object is erased the corresponding entry is removed and if there are no more active blocks the entire DS can be erased. Unlike the bitmap case that has a fixed memory requirement, here the amount of required memory decreases as objects are erased from the DS. This method is slightly less efficient in terms of the time it takes to erase an object but has the advantage of maintaining the information on the number of linked blocks.

As in the case of erase operations, when an object that is stored on the HDD is modified, the content of the DS on the HDD is not modified. The way in which modify operations are handled may depend on the nature of the modification and the way the modified object is used. For example, if the modification is small, the modification information may be recorded in the MS, e.g., in the identifier. Modifications that result in a significant change to the object may be handled by creating a new instance of the object in the active WS or in the MS. If a new instance of the object is created, then the identifier in the MS may be updated to indicate that the original object instance (which may be referenced by other objects) is now pointing to the new object, i.e., a link may be created between the address of the original object and the address of the new object. If multiple new instances of the same object are created over time (as a result of multiple updates) then it is only necessary to keep the original instance and the latest instance and the intermediate instances may be erased or ignored.

In a step 250, in response to a server failure, at least some of the persistent messaging data from the HDD is selectively read to the volatile memory. The selective reading is based on the identifier of the offloading in the second section of the NVRAM. Read operations of persistent data may be performed only during recovery of the server. During normal run time, read operations are not performed. By keeping a copy of the data in the volatile memory read operations can be avoided. With reference to FIG. 4, when server 100 fails and must be reconstructed, at least some of the persistent messaging data stored in HDD 170 is read to volatile memory 120 according to the relevant identifiers (i.e., relating to the read DSs) stored in MS 140.

The above method allows faster execution since all operations, during regular runtime of the server, are performed in the volatile memory and NVRAM, without involving HDD access. However, the fact that data on the HDD is not modified even when objects on the HDD are erased may lead to situations where a large amount of persistent data that is held on the HDD is no longer required since the objects have already been erased. The potential inefficient storage on the HDD may lead to longer server recovery time since reading data from the HDD is a costly operation. Furthermore, as more and more data is written to the HDD, the server may run out of disk space.

In order to address the above described situations, a mechanism that repeatedly compacts the persistent data on the HDD may be used. The compaction mechanism may be triggered per time interval, size or number of deleted objects or size or number of the DSs on the HDD. Compacting DSs is intended to keep the size of the data stored on the HDD close to the actual amount of live persistence data. This may be done based on the information held by the persistent data identifiers. The compaction mechanism may allow to easily restore, during server recovery, the live (i.e., not erased) objects on the HDD. Whenever an object that is stored on the HDD is to be erased, the compaction mechanism checks whether data compaction may be performed. When compaction may be performed, the compaction mechanism selects the most effective compaction operation that may be performed at that time.

Figure 6:
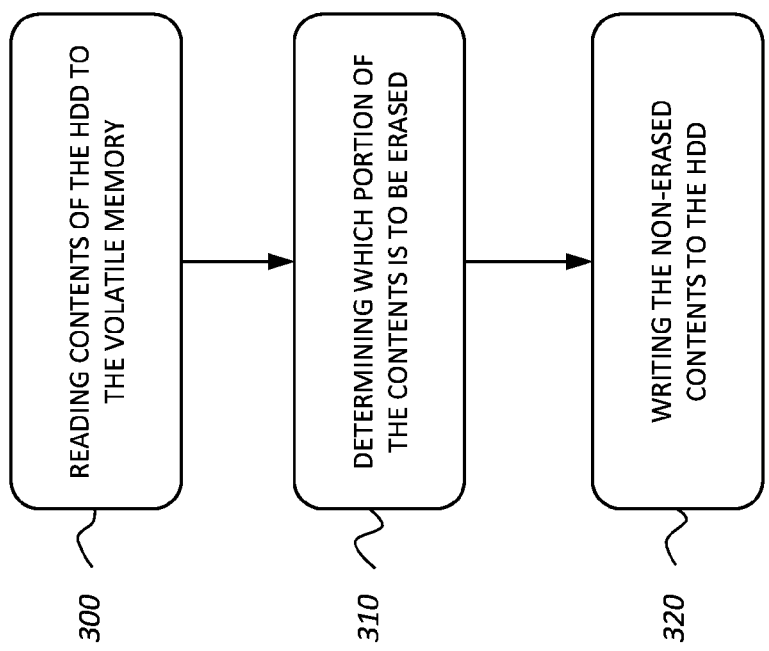
FIG. 6 shows a flowchart of a general method of compacting data sections in a hard disk device according to the method of FIG. 5.

Reference is now made to FIG. 6, which shows a flowchart of a general method of compacting DSs in an HDD according to the method of FIG. 5. In a step 300, at least some of the content of the HDD is read to the volatile memory. The read content may be one or more DSs. With reference to FIG. 4 and for example, a DS of HDD 170 is read to volatile memory 120.

In a step 310, a portion of the content to be erased is determined based on the identifier of the offloading in the second section of the NVRAM. The identifier may hold information with respect to erased objects in a DS. With reference to FIG. 4, the identifier of the DS, stored in MS 140, holds information that includes objects to be erased from the DS.

In a step 320, writing, to the HDD, the at least some of the contents less the portion determined to be erased is performed. The result is a compacted version of HDD content. The compacted version may be written to a temporary location on the HDD and then the old version of the DS content may be replaced on the HDD with the new compacted version. The old version may be erased from the HDD. With reference to FIG. 4, a compacted version of the DS is created in volatile memory 120, which does not include the erased objects of the DS. The compacted version of the DS replaces the DS on HDD 170 and the DS (i.e., the old version) is erased from HDD 170.

Typically, the compaction mechanism works in the background and is assigned a lower priority compared to the task of writing new data to the HDD (i.e., offloading of persistent messaging data from the NVRAM to the HDD). This ensures that the more performance-critical task of writing new data to the HDD is not affected by the compaction mechanism. However, in case the server becomes low on disk space, the compaction mechanism may be assigned a higher priority in order to avoid a situation where new data could not be written to the HDD.

There may be various rules for selecting the DS to be compacted. Examples for such rules may include selecting the DS with the largest difference between the actual-size and compacted-size or selecting the DS which is expected to yield the highest reduction of HDD space per unit of time. It should be noted that in some cases the compacted-size is not known exactly and can only be estimated. For example, when using an identifier including a bitmap to record the erased objects, there is no information on how many blocks are linked. This means that, if the size of the object is not known when it is erased, the number of blocks that are actually going to be freed is not known. Another example, is when using data compression as the compaction mechanism as will be elaborated below.

A DS may be indicated as ready for compaction by comparing a compacted-size of the DS to the current actual-size of the DS and if the difference exceeds a certain threshold the DS is marked as ready for compaction. Whenever an object is erased from the DS, a new compacted-size of the DS is calculated.

The server may include a compaction unit which may be responsible for the actual task of compacting DSs. The compaction unit may select the next DS to compact based on some logic and then performs the compaction of that DS. When it makes sense to do so, the compaction unit may compact multiple DSs simultaneously.

Compaction of the HDD content, once it was loaded to the volatile memory, can be performed in many ways but the basic rationale is to remove erased objects and unused space from the representation of the DS. Modified objects may be updated during compaction such that after compaction the DS holds the most updated information of the object. After the DS is compacted and written back to the HDD the object's update information that was stored in the MS (i.e., in the relevant identifier) may be deleted. In some embodiments, the compacting mechanism may employ a lossless compression algorithm. In some embodiments erased objects may not be completely removed but the space they occupy in the DS will be reduced. Below is a description of two optional compaction methods.

Figure 7:
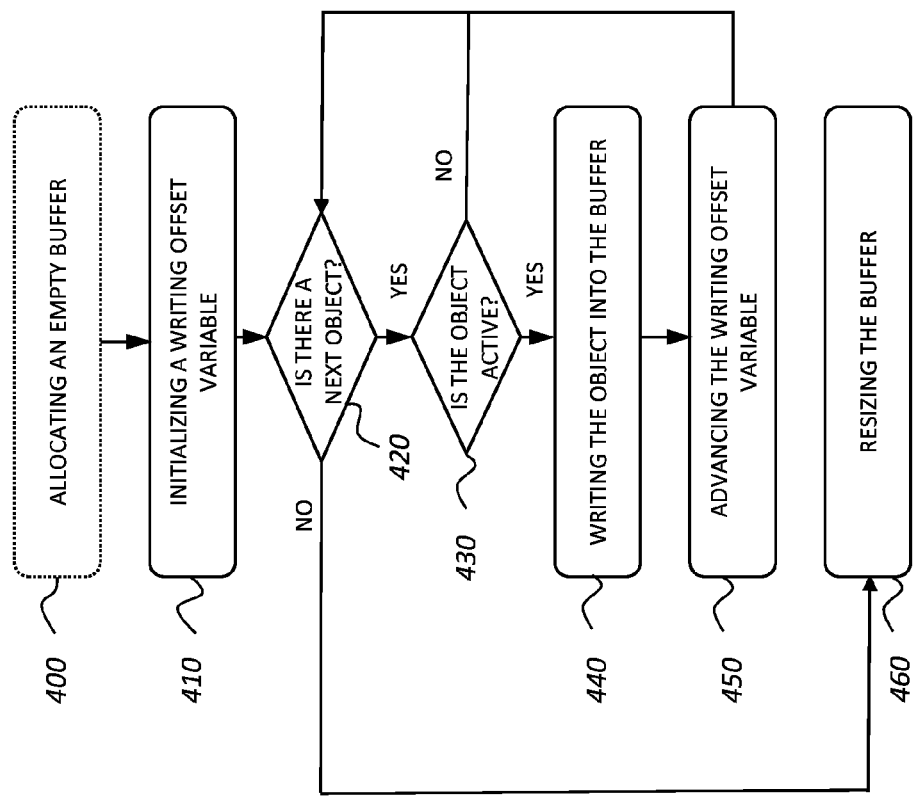
FIG. 7 shows a flowchart of a method of compacting data sections in a hard disk device by erasure according to the general method of FIG. 6.

Reference is now made to FIG. 7, which shows a flowchart of a method of compacting DSs in an HDD by erasure, according to the general method of FIG. 6. The steps of this method are performed in addition to the steps of the general method of FIG. 6.

In a step 400, an empty buffer is allocated in the volatile memory. The empty buffer is advantageously large enough to hold the DS to be compacted after the compaction. One may allocate the current size of the DS, which is always sufficient. If the compacted size is not known in advance, a buffer having an estimated size may be allocated and its capacity may be increased, if needed. Alternatively, the compaction may be done in-place by using the buffer in which the uncompacted DS is held as both the source and destination buffer. In such a case, step 400 is skipped.

In a step 410, a writing offset variable is initialized. The variable is used as the writing offset of the buffer. Such variable is allocated and then may be assigned to a specific buffer, a specific DS or used per demand. The variable is initialized for each empty buffer and before the compacting process of a DS begins. The initialization generally means setting the variable value to zero.

In a step 420, it is checked if there is a next object in the DS. A counter may be used to go over the objects that the DS currently contains. A next object in the DS is chosen (e.g., by order, from first to last) and constructed (i.e., assembling the object from its one or more linked blocks). If there are no more objects in the DS then the method continuous in a step 460.

In a step 430, it is checked if the chosen object is active (i.e., not erased). In order to check that, the information held by the DS identifier, stored in the MS, about active or erased objects or blocks is used. If the object is no longer active (i.e., has been erased) then the method continues in step 420. In case the object is active, it is optional to check if the object has a pending update and update it accordingly before proceeding to step 440. In such case, the updates may be removed from the MS (i.e., updating the relevant identifier accordingly) only after the compacted DS has been fully written to the HDD (step 320 of the method of FIG. 6).

In a first time that a DS is compacted, it is optional to further perform the following steps. For each block of the object, if the original position field in the block's header is not yet set, then it may be set to the position of the block in the original DS (i.e., before it was compacted for the first time). When the blocks of a new WS are initialized, the original position field in each block's header may be marked as not set. The first compaction may be performed on the WS when the DS is first created out of the WS. In this case, the original position may be recorded during this initial compaction phase.

In a step 440, if the object is active, it is written into the buffer. The object is written starting from the buffer position indicated by the writing offset variable.

In a step 450, the writing offset variable is advanced by the object's length. The method then continues with step 420 to choose the next object to be written to the buffer. The method continues accordingly until all of the active objects of the DS to be compacted are written consecutively (but not necessarily in the same order) to the buffer.

In a step 460, the buffer, which is now written with the DS active objects, is resized to fit its content, i.e., the DS original content less the portion which was determined to be erased. In case compaction is done in-place, the original buffer is resized accordingly.

At the end of the compaction procedure the buffer holds the new compacted version of the DS which may now be written back to the HDD. As an additional compaction phase, one may use a lossless data compression mechanism to compress the buffer and only then write it to the HDD.

It should be noted that when the (original) DS is compacted the first time, the last block of each object may contain unused space which is not copied to the buffer. This means that the DS size could be reduced when it is first compacted even if no objects have been erased yet. It is possible to perform compaction when the DS is created from the WS. Thus, when a WS is to be written to the HDD, it may be compacted first (and the original position of each block is marked) in the volatile memory and only then written to the HDD as a DS.

Figure 8:
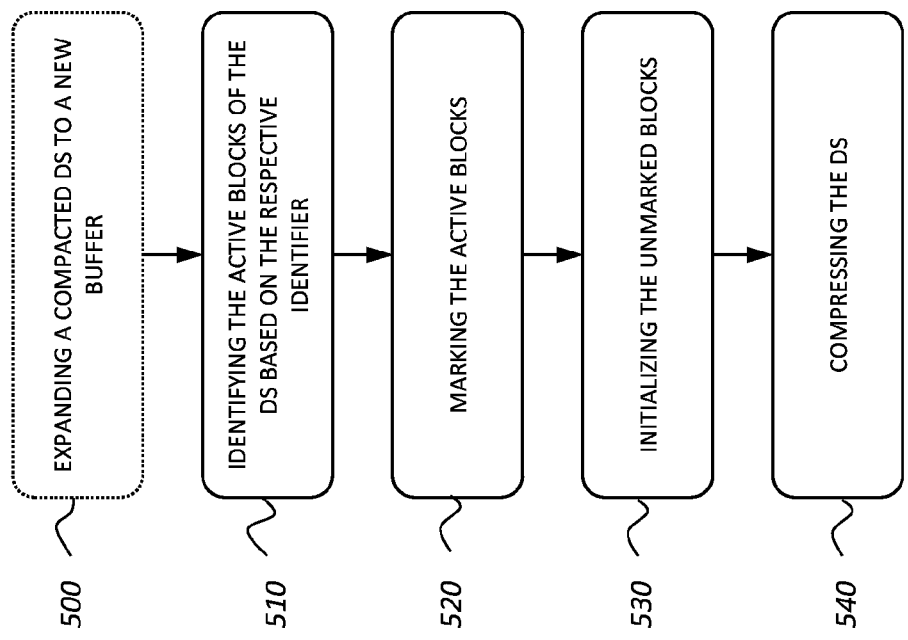
FIG. 8 shows a flowchart of a method of compacting data sections in a hard disk device by compression according to the general method of FIG. 6.

Reference is now made to FIG. 8, which shows a flowchart of a method of compacting DSs in an HDD by compression according to the general method of FIG. 6. The steps of this method are performed in addition to the steps of the general method of FIG. 6.

In an optional step 500, if the DS to be compacted is already compacted, then it is expanded to a new buffer, allocated in the volatile memory to create the structure of the original DS.

In a step 510, the active blocks of the DS are identified based on the respective identifier (i.e., the identifier of the offloading of the persistent messaging data included in the DS from the NVRAM) stored in the MS.

In a step 520, the active blocks of the DS (i.e., the blocks of the non-erased objects) are marked. This may be performed by going over the active blocks according to their offset in the DS starting with the lowest offset, while each active block and all the blokes linked to it (i.e., to form an object) are marked as in use.

In a step 530, the unmarked blocks, which are the blocks determined to be erased, are initialized, e.g., by setting their content to zero.

In a step 540, the DS (i.e., a representation of the DS, as read to the volatile memory according to the general method of FIG. 6) is compressed. The compression may be performed by using some lossless compression mechanism. The compressed representation of the DS is then written to the HDD.

During recovery, the data that was stored on the HDD is read in its compacted format which can significantly speed up recovery time. During recovery the compacted data may either be expanded to recreate the original data (i.e., not including the erased data portions) or that it may be used by the recovery process in the compacted format. The decision on whether to expand the data or work with it in its compacted form may be made in run time based on considerations such as the current size of the data the cost of expanding the data, the cost of working with the compacted form, and the available volatile memory.

During recovery, the DSs are read into the volatile memory in order to read the persistent objects stored in them and construct the server's state to the one it was before the failure. The DS may be read from the HDD to the volatile memory in its compacted form which helps to reduce the time it takes to read the DS and thus reduce the overall recovery time. When the compacted DS is in the volatile memory it is possible to expand it to reconstruct a new DS which is functionally equivalent to the original DS. The only difference between the new DS and the original DS is that the content of objects that were erased does not appear in the new DS. Since erased objects are not used in the recovery process, the new DS appears the same as the original DS to the recovery logic.

For example, using the compaction-by-erasure method of FIG. 7, reconstructing the original DS may involve the following simple steps: allocating a buffer with the size of the original DS to hold the expanded DS, setting all the blocks in the allocated buffer to an initial unused state, going over the objects in the compacted DS and copying each block to its original location (as indicated by the original position field in the block's header) in the new DS. If the compaction by compression method of FIG. 8 is used, then the new DS is reconstructed by uncompressing the compacted (compressed) DS.

In some embodiments, it is desirable or even required to allow the recovery process to work only with the compacted form of the DS without ever expanding the DS. Using the compacted form means that the DS is consuming less memory and thus the recovery process may work with more DSs in the volatile memory simultaneously. In order to be able to efficiently work with the compacted form of the DS the recovery procedure is advantageously able to perform two basic operations. The first operation is to go over all the objects one by one and the second operation is to directly access a specific object using its address.

Recovery process using only compacted form of the data may be advantageously performed on a DS that is compacted using the compaction-by-erasure method, but may also be performed on a DS that is compacted using the compaction-by-compression method. Going over the objects one by one is straightforward since the objects are placed in a consecutive manner in the compacted DS. Directly accessing a specific object using its address is more challenging since the address defines the location of the object within the original DS not within the compacted DS. Scanning the list of objects until the requested object is found is one option, but less efficient. Another option is to provide a translation map created for each DS to allow direct access to an object. The map translates an object's address to the object's location within the compacted DS. For example, the original addresses of the entire active (i.e., not erased) objects can be maintained in a sorted array where each entry in the array would point to the address in the compacted DS. To obtain an object, a binary search on the sorted array of addresses may be performed. To provide an even faster access it is possible to construct an array where the number of elements is equal to the number of blocks in the original DS and each element holds the address of this block in the compacted DS. This last option provides 0(1) access time but may typically requires more memory. For example, for a DS of 1 GB with 1M blocks the array will have 1M elements where each element will hold a 4 byte integer address resulting in a 4 MBytes translation map. The translation map may be created whenever the DS is compacted or once when the DS is used for the first time during recovery.

The decision on whether to expand the DS or work with it in its compacted form can be made in advance or during run time. The main considerations that may affect the decision of whether to expand a compacted DS or not are the cost of expanding the DS, the cost of working with the compacted form, and the available free memory. Run time decisions can also take into account the size of the compacted DS and how many DSs are currently being actively used by the recovery procedure.

High availability is also a desired characteristic of a server. In order to provide high availability, two or more nodes, each running an instance of the server, may be used. If one instance of the server fails, another instance may take its place. Two main reasons for running a server in an HA configuration (i.e., use more than one node) are the higher reliability by protecting against failures that may leave a single node server non-operational, and the faster recovery time, as there is no need to wait for the server to restart.

Numerous techniques for providing HA are known in the art. Herein below an exemplary configuration utilizing the common active-passive HA model is disclosed. In this model, one instance of the server is acting as primary/active and the other instances are acting as standby/passive nodes. To simplify the description, a configuration of two instances, one primary and the other standby, is disclosed. Applying this model to the persistent messaging system of the disclosed technique means that only the primary instant may interact with the clients and generate new data. New persistent messaging operations, such as create/erase/update a persistent object, are replicated from the primary instance to the standby instance. Replication is advantageously synchronous in order to prevent data loss. Thus, the primary instance may replicate the data to the standby instance and may complete the processing of the data only after it has been fully received by the standby instance. This is similar to the way that the data is written to NVRAM before the server may complete its processing in the single node case. The standby instance maintains identical persistent information as the primary instance, and in case the primary instance fails the standby instance takes over and replaces the primary instance. During the failover procedure, the standby instance may process the persistent data and may reconstruct the server's state in a similar way that recovery in a single node server is performed. Once recovery is completed, the standby instance may become the new primary instance and may start servicing clients, which are now allowed to connect to it. The clients resume processing their persistent data from the same point at which the old primary instance failed. Persistent data is advantageously not allowed to be lost during the failover procedure. In certain systems the failover procedure may be transparent to the clients while in other systems the clients may be required to perform certain operations, such as reconnect to the new primary server.

Figure 9:
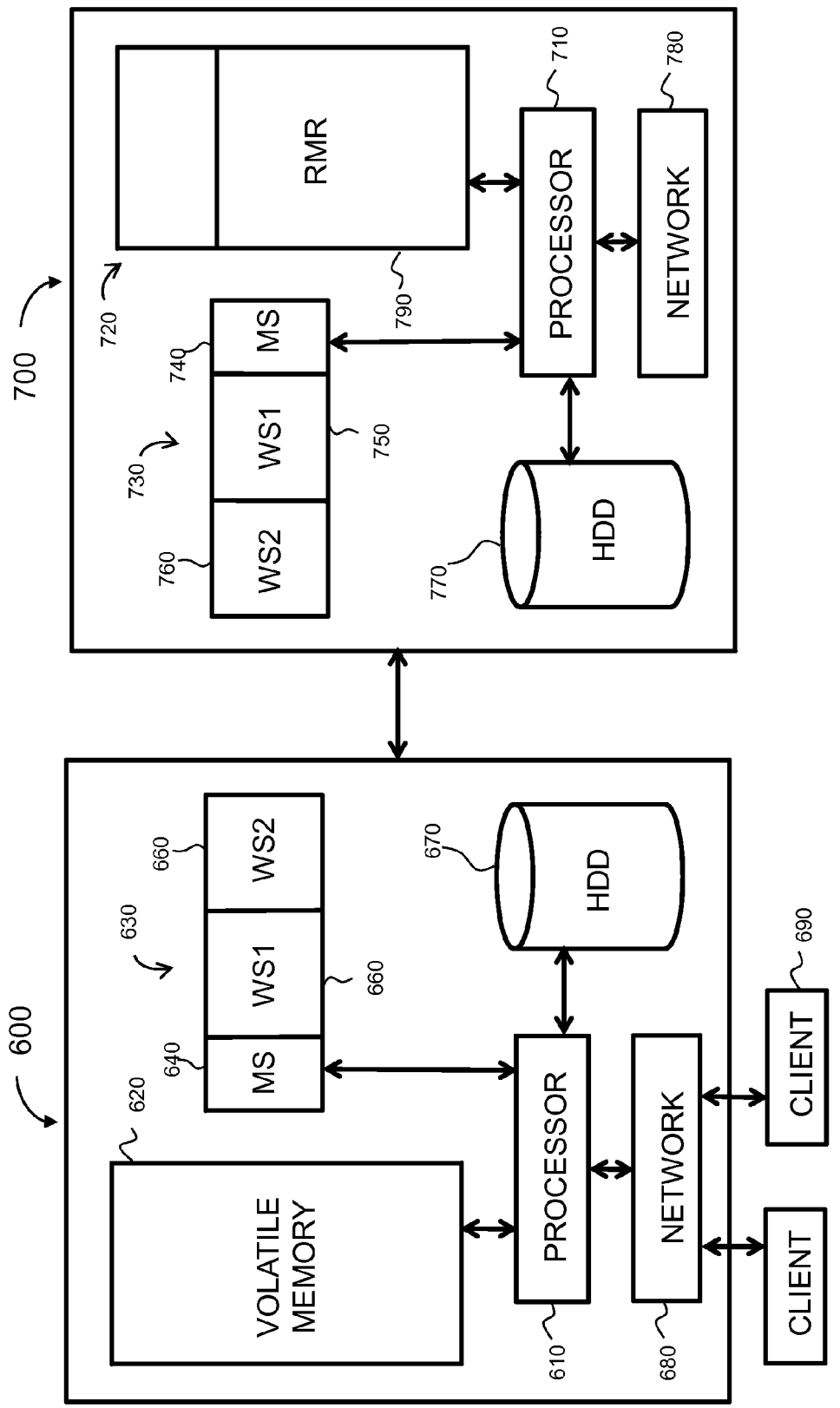
FIG. 9 shows a schematic illustration of a multi-node server according to another embodiment of the disclosed technique.

Reference is now made to FIG. 9 which shows a schematic illustration of a multi-node server according to another embodiment of the disclosed technique. The multi-node server includes two instances or nodes, a primary instance 600 and a standby instance 700. In some embodiments the multi-node server may include more than two instances. Primary instance 600 and standby instance 700 are generally similar to single node server 100 of FIG. 4 and may operate in a similar manner with some modifications that will be detailed herein below.

Primary instance 600 may include a hardware processor 610, a volatile memory 620, an NVRAM 630, an HDD 670 and a network unit 680. NVRAM 630 may include an MS 640, a first work section, WS1 650 and a second work section, WS2 660. Processor 610 is coupled with volatile memory 620, NVRAM 630, HDD 670 and network unit 680. Primary instance 600 may be used for managing persistent messaging data. Processor 610 and volatile memory 620 may be used to maintain and manage the entire message information. NVRAM 630 may be used to store recent persistent messaging data. HDD 670 may be used to store older persistent messaging data that can no longer be stored in NVRAM 630 due to the limited amount of NVRAM 630 available. Primary instance 600 may receive message data from clients, such as client 690, and may send data to clients in a publish/subscribe system by network unit 680. Primary instance 600 may further use network unit 680 to communicate with standby instance 700. The communication channel between primary instance 600 and standby instance 700, indicated in FIG. 9 as a bidirectional arrow, may be over a network or a direct connection (e.g., back-to-back cabling).

Standby instance 700 may include a hardware processor 710, a volatile memory 720, an NVRAM 730, an HDD 770 and a network unit 780. NVRAM 730 may include an MS 740, a first work section, WS1 750, and a second work section, WS2 760. Volatile memory 720 may include a dedicated memory region, which will be referred to as Recovery Memory Region (RMR) 790. Processor 710 is coupled with volatile memory 720, NVRAM 730, HDD 770 and network unit 780. Standby instance 700 may be used to replace primary instance 700 in case it fails, to provide high availability of the multi-node server. Standby instance 700 may store a replication of the persistent messaging data maintained by primary instance 600. Processor 710 may be used to manage the replicated persistent messaging data. NVRAM 730 may be used to store recent persistent messaging data. NVRAM 730 is advantageously maintained identical to NVRAM 630. HDD 770 may be used to store older persistent messaging data that can no longer be stored in NVRAM 730 due to the limited amount of NVRAM 730 available. HDD 770 may or may not be identical to HDD 670. Standby instance 700 may utilize its free resources (as opposed to primary instance 600, such as free memory in volatile memory 720, to store a copy of at least a portion of the older persistent messaging data stored in HDD 770, and to store data in HDD 770 in a more efficient way (e.g., by performing compaction). Standby instance 700 may communicate with primary instance 600 by network unit 780, for example to receive message data and instructions relating to the stored message data from primary instance 600 or send data to primary instance 600.

The manner of operation of the multi-node server of FIG. 9 may be according to the method of FIG. 10, as detailed herein below.

Figure 10:
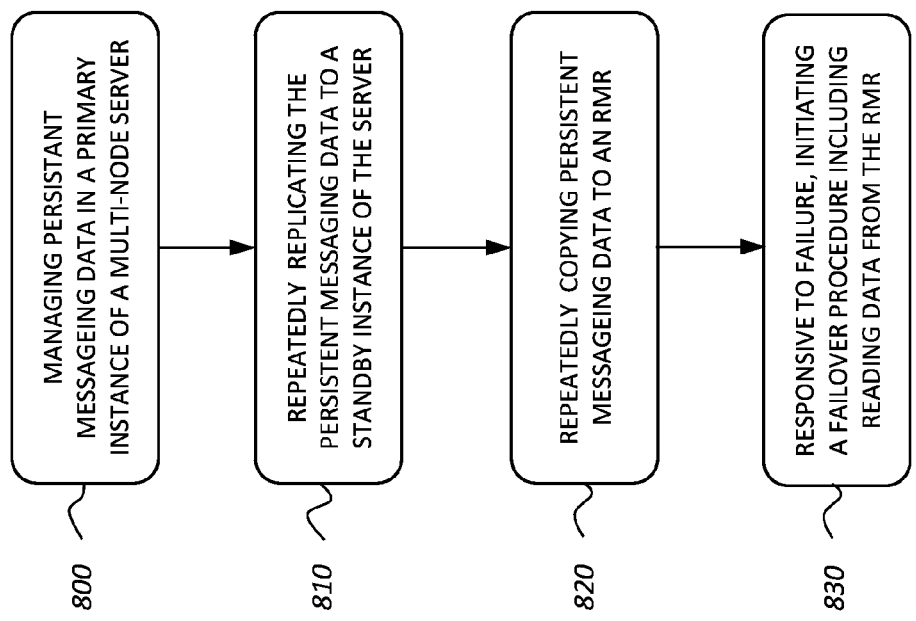
FIG. 10 shows a flowchart of a method for highly available persistent messaging utilizing a multi-node server according to the disclosed technique.

Reference is now made to FIG. 10 which shows a flowchart of a method for highly available persistent messaging utilizing a multi-node server according to the disclosed technique. In a step 800, persistent messaging data is managed in a volatile memory of a primary instance of a multi-node server. The persistent messaging data is stored in an HDD and in an NVRAM of the primary instance. With reference to FIG. 9, primary instance 600 managed persistent messaging data in volatile memory 620 by processor 610. The persistent messaging data is stored in NVRAM 630 and HDD 670. During runtime, primary server 600 may operate in the same manner as single node server 100 of FIG. 4 with the modifications disclosed herein.

In a step 810, the persistent messaging data is repeatedly replicated to a standby instance of the multi-node server. The persistent messaging data is replicated to an HDD of the standby instance that correspond to the HDD of the primary instance and to an NVRAM of the standby instance that correspond to the NVRAM of the primary instance. In some embodiments, the multi-node server may include more than one standby instance. With reference to FIG. 9, primary instance 600 sends data, such as persistent messaging data to be replicated or instructions relating to updates to the replicated data, to standby instance 700 by network unit 680. Processor 710 handles the replication of the received data and the updating of the replicated data according to the received instructions in NVRAM 730 and in HDD 770. The replication may be performed such that NVRAM 730 is identical to NVRAM 630 and HDD 770 is identical to HDD. However, it is more advantageous to utilize the free resources of standby instance 700 to store persistent messaging data more efficiently.

During runtime, the primary instance repeatedly replicates persistent data to the standby instance. Whenever an operation that changes persistent data information is performed, the primary instance may encode the information in a replication message and send it over to the standby instance. The standby instance may receive the replication message, perform the instructions in the message, and then return a confirmation message (e.g. an "ACK") to the primary instance. Once the primary instance receives the ACK from the standby, it may complete the persistent data operation. The replication message may include information on memory updates that the standby instance should perform on either the active WS, the data stored in the MS or data in volatile memory. By performing the instructions from the primary instance, the standby instance may maintain the content of its NVRAM (i.e., the MS and two WSs) identical to that of the primary instance. This may allow the standby instance to take over in case the primary instance fails without any data loss. The fact that processing an high availability replication message involves only updates to the NVRAM content may ensure that the messages are processed extremely fast, thus minimizing the impact that adding high availability has on the performance of the server. Such a replication model also may allow an easier and more efficient processing of multiple concurrent replication streams.

When a new persistent object is created, the primary instance may create a message that instructs the standby instance to copy the object's content into the same location (i.e., in the active WS) that the primary instance uses for the object. The content of the object may be provided in the message. Any additional NVRAM updates (e.g., MS updates) that may be involved in creating the object are also performed at the same NVRAM locations in the primary instance and in the standby instance. When an object is erased, the primary instance may provide the necessary changes that should be made in the MS to record that the object has been erased. For example, if the bitmap method, detailed herein above, is used to record erased objects, then the replication message may indicate which bit in the appropriate bitmap, which is stored in the MS, should be reset. As in the single node server, erasing an object does not change the DS containing it.

When the primary instance creates a new DS, from the active WS that filled up (i.e., offloading data from the active WS to the HDD), it may also instruct the standby to do so and wait until the standby reports that it completed the task. The instructions message may include the offloading identifier. The standby instance may use the identifier of the primary instance or generate a new one. The WS may not be considered free until it has been written to HDD by both the standby instance and the primary instance. Although they are created by each instance locally, the initial DS created by the primary and standby instances is identical (i.e., since the WS content at both instances is identical). Going forward, the primary instance and the standby instance may compact the DSs independently and possibly even use different compaction methods. It is still possible, however, to let the primary instance perform the decisions of which DS should be compacted and when. Allowing the primary instance to make the decisions has certain advantages and disadvantages. In the description that follows, it is assumed that each instance makes the decisions regarding DS compaction locally and independently.

In a step 820, persistent messaging data is repeatedly (e.g., per time interval) copied to an RMR of the standby instance. The RMR is allocated in the volatile memory of the standby instance. Persistent messaging data of the standby instance is repeatedly copied to the RMR, such that at any given time, the RMR includes a copy of at least some of the persistent messaging data stored in the HDD of the standby instance. The persistent message data may be copied from the NVRAM, when a DS is first created from the WS (advantageously after initial compaction) or from the HDD. With reference to FIG. 9, volatile memory 720 includes RMR 790. Processor 710 repeatedly copies persistent messaging data stored in HDD 770 into RMR 790.

The standby instance may utilize the volatile memory since it is hardly utilized due to the fact that the standby instance does not interact with clients and does not maintain the server's state in memory. Therefore, the standby instance uses the free main memory to create the RMR which may be used to store DSs in memory. When a DS is first created from a WS, the WS may be first compacted to remove any unused space in it. The outcome of this compaction is a new DS. The new DS is then written to the HDD and, if the RMR has enough space for it, then the DS is also copied to the RMR. Although the initial DS created by the standby instance is identical to that created by the primary instance, from that point on the standby instance may handle the DS independently from the primary instance.

The selection of which DS should be the next one to be loaded into the RMR may be based on some heuristic that aims to minimize recovery time. One possible heuristic is to follow the order in which the DSs are used by the recovery procedure. This may help to prevent the case where a DS has to be removed from the RMR because another DS has to be read from the HDD to the volatile memory. Other optional heuristics may take into account factors such as the current free space in the RMR, the sizes of the DSs which are not in RMR, the time it takes to read a DS from the HDD to the volatile memory as a function of the DS size, and more.

In a step 830, in response to failure of the primary instance, a failover procedure is initiated by the standby instance. The failover procedure includes reading persistent messaging data from the RMR in lieu of the HDD of the standby instance. With reference to FIG. 9, processor 710 of standby instance 700 detects that primary instance 600 failed. Processor 710 then initiates a failover procedure. Persistent messaging data, which is not stored in RMR 790, is read from NVRAM 730 and HDD 770. The persistent messaging data is read based on the information stored in MS 740 (i.e., based on the identifiers stored thereon). Processor 710 may erase persistent messaging data from RMR 790 once it has been used by the failover procedure.

In order to detect failure of the primary instance, any failure detection mechanism, from the many known in the art, may be used. The failover procedure may include several tasks that may be performed in order to allow the standby instance to starts acting as the new primary instance. A part of failover is the construction, by a recovery procedure, of the server's state using the available persistent messaging data. Recovering the server's state during failover may be done in a similar way to the recovery procedure performed by a single node server after a failure (e.g., server 100 of FIG. 4). However, during the failover procedure, the DSs are used directly from the RMR whenever possible, which saves the time-consuming task of reading the DSs from the HDD. The DSs may be used in a compacted format and thus may not consume additional memory. The recovery procedure may provide information on which DSs are no longer needed (i.e., have been processed) and these DSs may be erased from the RMR. If there are DSs on the HDD which are still needed for recovery but are not in the RMR, and the RMR has enough free space to read another DS from the HDD, then a read for the next DS may be performed even before this DS is requested by the recovery procedure.

The recovery procedure may indicate the amount of free memory needed for the next step of constructing the messaging state. If needed, DSs are erased from the RMR in order to ensure that the recovery mechanism has enough free memory to construct the messaging state. Initially the RMR may consume a large portion of the volatile memory, but as recovery progresses, the size of the messaging state increases and the size of the RMR decreases. It is advantageous for a recovery procedure to process a DS only once, which means that the DS may be erased from the RMR after it is processed the first time. It is further advantageous to achieve a balance, in which as the size of the server's state increases, the size of the RMR decreases, while still maintaining all the DSs required by the recovery process.

A standby instance according to the disclosed technique may compact persistent messaging data stored therein (in the RMR or on the HDD) to allow a more efficient operation during runtime and during failover. Generally, the compaction methods and mechanisms disclosed herein above may be used (e.g., the methods of FIGS. 6, 7 and 8). Further compaction methods or mechanisms are disclosed herein below.

Whenever an object is erased from a DS, the standby instance may calculate the new compacted size of the DS. The standby instance may maintain two or more different compaction thresholds, one for RMR compaction and one or more for HDD compaction. The standby instance may record the actual size of the DS in the RMR and on the HDD. If the difference between the size of the DS in the RMR and the new compacted size exceeds the RMR compaction threshold then the DS may be marked as ready for compaction in RMR. Likewise, if the difference between the size of the DS on the HDD and the new compacted size exceeds the HDD compaction threshold then the DS is marked as ready for compaction on the HDD. Typically, the RMR compaction threshold may be considerably lower than the HDD compaction threshold. The reason is, that compaction in the RMR is much faster as it is done entirely in the volatile memory. Provided that there are enough processing resources for it, one may compact multiple DSs in RMR in parallel independently since, unlike DS's on HDD, there is no contention for a shared resource. The low RMR compaction threshold and the ability to perform the compaction in a very short amount of time may ensure that DSs stored in the RMR are kept close to their minimal possible size. This may allow the standby instance to fit a large number of DSs in the RMR. Compaction of DSs on the HDD is advantageously performed less frequently due to the higher cost resulting from the need to read the DS from the HDD and write it back to the HDD.

A compaction mechanism according to the disclosed technique may assign each DS a compaction-priority based on its RMR copy status. A DS RMR copy status may change over time. Examples for such RMR copy statuses are as following (from highest to lowest priority):

(1) The DS on the HDD which is the next DS that should be read into the RMR. This DS is compacted as soon as its calculated compacted size indicates that it is possible to add it into the RMR (i.e., possibly after compaction). One should note that this category is empty when all DSs have a copy in the RMR.

(2) DSs that do not have a copy in the RMR (but are not the next DS to be loaded to RMR) these DSs get higher priority for compaction since they will have to be read from the HDD in case of a failover and decreasing their size would thus speed up recovery.

(3) DSs that have a copy in the RMR. During failover, these DSs are read from the RMR and not from the HDD so it may be less important to compact them. The DSs still need to be compacted in order to avoid filling up the HDD and in order to reduce recovery time in case the instance has to perform cold recovery (i.e., in which the RMR content is gone), for example, after a power loss.

It is possible to use a different disk compaction threshold for DSs in categories two and three. If free HDD space is becoming low then the priority of categories two and three may be made equal in order to avoid running out of HDD space.

It is advantageous that the compaction method used by the standby instance may allow the DS to be used in its compacted form both during recovery and when compacting an already compacted DS. It may also be an advantage if compacting the DS may be done in-place using the same memory the DS is already occupying (and releasing the free memory after compaction). The compaction-by-erasure method of FIG. 7 may provide these properties and therefore may be advantageously used.

In cases where the RMR cannot hold all the DSs, an additional compaction phase that takes the output of compaction-by-erasure may be added in order to try and fit more DSs in the RMR. The additional compaction phase may be a lossless compression, or compaction methods such as data de-duplication techniques (see, for example, methods described in: A. Elmagarmid, P. Ipeirotis, and V. Verykios. Duplicate record detection: A survey. IEEE Transactions on Knowledge and Data Engineering, 19: 1-16, 2007), and lossless compression techniques. These techniques may be applied on an individual DS basis or combine multiple DSs in order to increase their effectiveness. In cases where the compacted DS may no longer be used in its compacted form after the second phase compaction, some free space may be reserved in order to allow a DS to be expanded to its first phase compaction state. Given that the need to uncompact de-duplication and/or compression during re-compaction and during recovery is likely to somewhat slow down these tasks, second phase compaction may be performed only when the overall effect justifies it. In particular, as long as all the DSs can fit in the RMR in their first phase compaction form, there is no need to apply a second phase compaction.

A compaction mechanism according to the disclosed technique may use the processor and memory resources, which are likely less utilized in a standby instance, due to the fact that the instance is not actually interacting with clients. High priority may be provided to the resources associated with fast replication but any free resources may be assigned to the compaction mechanism to allow it to perform its tasks as quickly as possible (e.g., compact multiple DSs at the same time). This may allow the standby instance to perform more frequent compaction independently from the primary instance without affecting the speed of replicating the data. As in the case of a single node server (e.g., server 100 of FIG. 4), compaction tasks that interact with the HDD may be assigned a lower priority compared to the more performance critical task of writing new DSs to the HDD, that as long as free HDD space is not a problem.

The high availability model disclosed herein is active-passive with a warm standby. However, other high availability models may be used. For example, a high availability model of active-active may be used where both instances are processing client data. This model may have several advantages, mainly in the ability to balance the load between multiple instances but it also has its drawbacks (e.g., more complex, potential unfair service to different clients, potential overload of instances in case of a failure, etc). Despite the differences it is possible to apply the invention described here to an active-active high availability model. Furthermore, instead of the warm standby model disclosed herein, other high availability models may use a hot standby where the standby instance is repeatedly processing the data that the primary instance is processing and constructs the server's state. This model has the advantage of an even faster failover since the server's state does not have to be reconstructed. However, the hot standby model is more complex and has stricter replication requirements, mainly around ordering of operations, which eventually may decrease performance during normal run time compared to the simpler warm standby model described herein.

In some embodiments, more than two instances of the multi-node server may be used. In such embodiments, one or more instances may be used as primary instances and one or more instances may be used as standby instances. In case more than one instance is used as primary or standby instance, a mechanism for dividing the work load between the multiple instances may be used, as known in the art. For example, in case of a single primary instance and multiple standby instances, each standby instance may perform the same tasks as described earlier with respect to the single standby instance of a single standby instance and a single primary instance embodiment. The primary instance is only different in a sense that it replicates the data to all of the standby instances, and accordingly has to wait for ACKs from all of them.

The flowcharts and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising using at least one hardware processor for:
    managing persistent messaging data in a volatile memory;
    writing said persistent messaging data to a first section of a Fast Persistent Memory (FPM), wherein the FPM is comprised of non-volatile random access memory (NVRAM);
    responsive to the first section of the FPM approaching a full state, offloading the persistent messaging data from the first section of the FPM to a hard disk device (HDD), and erasing the persistent messaging data from the first section of the FPM;
    recording, in a second section of the FPM, an identifier of said offloading;
    responsive to receiving a request to erase or modify at least some of the persistent messaging data in the HDD, updating the identifier of said offloading in the second section of the FPM while leaving the persistent messaging data in the HDD intact; and
    responsive to a server failure, selectively reading at least some of the persistent messaging data from the HDD to the volatile memory, wherein said selective reading is based on the identifier of said offloading in the second section of the FPM.

2. The method according to claim 1, wherein the first section of the FPM is divided into two or more sub-sections, and wherein said offloading is from one of the two or more sub-sections.

3. The method according to claim 1, further comprising using the at least one hardware processor for compacting at least some of the persistent messaging data in the HDD, wherein said compacting is based on the identifier of said offloading in the second section of the FPM.

4. The method according to claim 3, wherein said compacting comprises:
    reading at least some of the contents of the HDD to the volatile memory;
    determining which portion of the at least some of the contents is to be erased, wherein said determining is based on the identifier of said offloading in the second section of the FPM; and
    writing, to the HDD, the at least some of the contents less the portion determined to be erased.

5. The method according to claim 4, wherein said compacting further comprises:
    writing said at least some of the contents less the portion determined to be erased to a buffer; and
    resizing said written buffer to fit the size of its content,
    wherein said writing, to the HDD, the at least some of the contents less the portion determined to be erased comprises writing said written buffer to said HDD.

6. The method according to claim 4, wherein said compacting further comprises:
    marking said at least some of the contents less the portion determined to be erased as in use;
    initializing said portion determined to be erased; and
    compressing said at least some of the contents of the HDD.

7. The method according to claim 3, wherein said selectively reading at least some of the persistent messaging data from the HDD to the volatile memory in response to said server failure is performed wherein at least some of the persistent messaging data is in a compacted form and without expanding it.

8. The method according to claim 7, wherein said persistent messaging data comprises one or more objects, and wherein said method further comprises providing a translation map to allow a direct access to an object of said at least some of the persistent messaging data in a compacted form in said HDD.

9. The method according to claim 3, wherein said compacting comprises modifying said at least some of the persistent messaging data in the HDD based on said identifier.

10. The method according to claim 1, wherein reading of at least some of the persistent messaging data from the HDD to the volatile memory, is performed only in response to said server failure.

11. The method according to claim 1, wherein said persistent messaging data comprises one or more objects, wherein each of the offloading forms a data section in the HDD, each data section comprising one or more blocks, and wherein each object offloaded to said HDD is stored in one or more of said blocks.

12. The method according to claim 11, wherein said identifier comprises a bitmap for each data section of the HDD, said bitmap comprising a bit for each of said one or more blocks of said data section, the method further comprising:
    setting to one each bit of said bitmap representing a block being the first block of an active object of said one or more objects offloaded to the data section; and
    turning off each bit of said bitmap representing a block not being the first block of an active object of said one or more objects offloaded to the data section, wherein said updating of the identifier in response to receiving a request to erase at least some of the persistent messaging data in the HDD comprises turning off the bit representing the first block of each object of the at least some of the persistent messaging data.

13. The method according to claim 1, further comprising responsive to receiving a request to erase or modify at least some of the persistent messaging data in the first section of the FPM, erasing or modifying said at least some of the persistent messaging data directly in said FPM.

14. A computer program product for persistent message handling, the computer program product comprising a non-transitory computer-readable storage medium having program code embodied therewith, the program code executable by at least one hardware processor to:
    manage persistent messaging data in a volatile memory;

write said persistent messaging data to a first section of a Fast Persistent Memory (FPM), wherein the FPM is comprised of non-volatile random access memory (NVRAM);

responsive to the first section of the FPM approaching a full state, offload the persistent messaging data from the first section of the FPM to a hard disk device (HDD), and erase the persistent messaging data from the first section of the FPM;

record, in a second section of the FPM, an identifier of said offloading;

responsive to receiving a request to erase or modify at least some of the persistent messaging data in the HDD, update the identifier of said offloading in the second section of the FPM while leaving the persistent messaging data in the HDD intact; and responsive to a server failure, selectively read at least some of the persistent messaging data from the HDD to the volatile memory, wherein said selective read is based on the identifier of said offload in the second section of the FPM.

15. The computer program product according to claim 14, wherein said program code is further executable by said at least one hardware processor to compact at least some of the contents of the HDD, wherein said compact is based on the identifier of said offloading in the second section of the FPM.

16. The computer program product according to claim 15, wherein said compact comprises:

reading at least some of the contents of the HDD to the volatile memory;

determining which portion of the at least some of the contents is to be erased, wherein said determining is based on the identifier of said offload in the second section of the FPM; and writing, to the HDD, the at least some of the contents less the portion determined to be erased.

17. A server comprising:

a volatile memory;

a Fast Persistent Memory (FPM), wherein the FPM is comprised of non-volatile random access memory (NVRAM); a hard disk device (HDD); and a hardware processor operatively coupled to said volatile memory, said FPM and said HDD, wherein said hardware processor is configured for:

managing persistent messaging data in said volatile memory;

writing said persistent messaging data to a first section of said FPM;

responsive to the first section of said FPM approaching a full state, offloading the persistent messaging data from the first section of said FPM to said HDD, and erasing the persistent messaging data from the first section of said FPM;

recording, in a second section of said FPM, an identifier of said offloading;

responsive to receiving a request to erase or modify at least some of the persistent messaging data in said HDD, updating the identifier of said offloading in the second section of said FPM while leaving the persistent messaging data in said HDD intact; and responsive to a server failure, selectively reading at least some of the persistent messaging data from said HDD to the volatile memory, wherein said selective reading is based on the identifier of said offloading in the second section of said FPM.

18. The server according to claim 17, wherein the first section of said FPM is divided into two or more sub-sections, and wherein said offloading is from one of the two or more sub-sections.

19. The server according to claim 17, further comprising a compacting unit configured for compacting at least some of the contents of said HDD, wherein said compacting is based on the identifier of said offloading in the second section of said FPM.

20. The server according to claim 19, wherein said compacting comprises:

reading at least some of the contents of said HDD to the volatile memory;

determining which portion of the at least some of the contents is to be erased, wherein said determining is based on the identifier of said offloading in the second section of said FPM; and writing, to said HDD, the at least some of the contents less the portion determined to be erased.

* * * * *